US009895854B2

(12) United States Patent
Ciptokusumo et al.

(10) Patent No.: US 9,895,854 B2
(45) Date of Patent: Feb. 20, 2018

(54) VULCANIZING MOLD FOR WINTER AND ALL-SEASON VEHICLE TIRES AND METHOD FOR MAKING THE VULCANIZING MOLD AND PNEUMATIC VEHICLE TIRE

(71) Applicant: Continental Reifen Deutschland GmbH, Hannover (DE)

(72) Inventors: Joharsyah Ciptokusumo, Hannover (DE); Magnus Hasseloef, Hannover (DE); Marko Drews, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 15/174,717

(22) Filed: Jun. 6, 2016

(65) Prior Publication Data

US 2016/0279887 A1    Sep. 29, 2016

Related U.S. Application Data

(63) Continuation of application No. PCT/EP2014/071617, filed on Oct. 9, 2014.

(30) Foreign Application Priority Data

Dec. 6, 2013   (DE) .................... 10 2013 225 160

(51) Int. Cl.
*B29D 30/06* (2006.01)
*B29C 33/10* (2006.01)
(Continued)

(52) U.S. Cl.
CPC .......... *B29D 30/0606* (2013.01); *B29C 33/10* (2013.01); *B29C 33/424* (2013.01); *B29D 2030/0617* (2013.01); *B29L 2031/757* (2013.01)

(58) Field of Classification Search
CPC ........ B29D 30/0606; B29D 2030/0617; B29C 33/10; B29C 33/424
See application file for complete search history.

(56) References Cited

U.S. PATENT DOCUMENTS

| 4,553,918 A | * | 11/1985 | Yoda .................. B29D 30/0606 425/46 |
| 5,066,209 A | * | 11/1991 | Schmaderer ............ B29C 33/10 425/28.1 |
| 5,415,826 A | | 5/1995 | Lange et al. |

FOREIGN PATENT DOCUMENTS

| DE | 195 43 276 C1 | 2/1997 |
| DE | 102012102322 A1 | 9/2013 |

(Continued)

OTHER PUBLICATIONS

International Search Report dated Jan. 26, 2015 of international application PCT/EP2014/071617 on which this application is based.

*Primary Examiner* — James Mackey
(74) *Attorney, Agent, or Firm* — Walter Ottesen, P.A.

(57) ABSTRACT

A vulcanizing mold for winter and all-season vehicle tires includes a mold body and an inner side mold surface having a negative tread profile having negative profile elements for molding a positive tread profile having positive profile elements of the vehicle tire to be vulcanized. Lamellar plates are arranged in the negative profile elements and configured to generate sipes in the positive profile elements. The negative profile elements include a shoulder negative profile element and at least one venting slot arranged within the shoulder negative profile element. The venting slot runs parallel and in spaced relationship to one of the lamellar plates arranged in the shoulder negative profile element. At least one cylindrical vent is arranged only axially outwards with reference to the venting slot.

19 Claims, 4 Drawing Sheets

(51) Int. Cl.
*B29C 33/42* (2006.01)
*B29L 31/00* (2006.01)

(56) References Cited

FOREIGN PATENT DOCUMENTS

| | | |
|---|---|---|
| DE | 10 2012 104 500 A1 | 11/2013 |
| EP | 1 529 627 A1 | 5/2005 |
| EP | 2 095 931 A1 | 9/2009 |
| JP | 5-138762 A | 6/1993 |
| JP | H05171644 A | 7/1993 |
| JP | 11-179730 A | 7/1999 |
| JP | 2002012005 A | 1/2002 |
| JP | 2002-264145 A | 9/2002 |
| JP | 2005199487 A | 7/2005 |
| JP | 2008-44155 A | 2/2008 |
| JP | 2009255303 A | 11/2009 |
| JP | 2011-104819 A | 6/2011 |

* cited by examiner

VULCANIZING MOLD FOR WINTER AND ALL-SEASON VEHICLE TIRES AND METHOD FOR MAKING THE VULCANIZING MOLD AND PNEUMATIC VEHICLE TIRE

CROSS REFERENCE TO RELATED APPLICATIONS

This application is a continuation application of international patent application PCT/EP2014/071617, filed Oct. 9, 2014, designating the United States and claiming priority from German application 10 2013 225 160.2, filed Dec. 6, 2013, and the entire content of both applications is incorporated herein by reference.

FIELD OF THE INVENTION

The invention relates to a vulcanizing mold for winter and all-season vehicle tires. The vulcanizing mold has, on the inner side, mold surfaces with a negative tread profile with negative profile elements for the formation of the positive tread profile with positive profile elements of the vehicle tire to be vulcanized, wherein, in the negative profile elements, there are arranged lamellar plates which generate sipes in the vehicle tire to be vulcanized, and wherein, within a shoulder negative profile element, there is arranged at least one ventilation slot as ventilation means, wherein the ventilation slot runs parallel to and spaced apart from a lamellar plate arranged in the shoulder negative profile element.

BACKGROUND OF THE INVENTION

A vulcanizing mold of this type is described in DE 10 2012 104 500. The ventilation slots are, within the negative mold surface of the profile, the only ventilation means through which the air can be discharged from the mold cavity to the outside. Hitherto conventional cylindrical ventilation means, such as for example the so-called "Eurovents" disclosed in DE 195 43 276 A1, are omitted. With the vulcanizing mold mentioned above, the cumbersome and expensive cleaning or exchange of blocked cylindrical ventilation means is avoided. The tire hot-pressed by way of the abovementioned vulcanizing mold, which tire was preferably pre-wetted, exhibits excellent manufacturing quality in a tread region arranged axially at the inside in relation to the shoulder profile block elements. However, the ventilation in the shoulder profile elements, and in a circular ring-shaped region situated axially at the outside in relation to the shoulder profile elements, still exhibits potential for improvement.

It is generally known, in vulcanization molds, to provide ventilation means which are connected to the atmosphere. In the hot-pressing process of the tire blank, during the pressing of the tire blank against the mold surfaces, the ventilation means discharge from the mold cavity the air that remains between the tire blank and the mold surfaces. It is sought to avoid undesired defects in the form of unevennesses on the surface of the tire. During the hot-pressing process, the tire blank has its final contour imparted to it, and is, as a result of rubber cross-linking reactions, brought into its rubber-elastic state.

SUMMARY OF THE INVENTION

It is the object of the present invention to provide a vulcanizing mold for vehicle tires, having ventilation means which reliably discharge the air out of the mold cavity, and by way of which a vehicle tire can be manufactured which exhibits excellent manufacturing quality in particular also in its shoulder region.

The object is achieved in that at least one cylindrical ventilation means is additionally arranged axially at the outside in relation to the ventilation slot which is arranged within a shoulder negative profile element.

The shoulder region of a tire is particularly difficult to ventilate. Since the ventilation slots are arranged only in negative profile elements, additional cylindrical ventilation means, which are arranged axially at the outside in relation to the axially outermost ventilation slot, are an effective measure for achieving excellent manufacturing quality of the hot-pressed tire. The additional ventilation means assist the ventilation in the critical shoulder region of the tire, where no further ventilation slots can be arranged owing to structural conditions. This applies both axially at the outside within a shoulder negative profile block, and also axially at the outside in relation to the shoulder negative profile block, in the so-called "TWI region".

The "TWI region" refers to the region arranged between the profile ring and the bead ring of a complete tire vulcanizing mold. The notification symbol which notifies the consumer of the corresponding wear indicator in the tire profile is arranged in the TWI region.

The expression "lamellar plate" also refers to elements which emboss sipes into profile elements of the tire to be hot-pressed, which elements are not produced from plate but are produced for example by way of layer build-up methods.

It is advantageous if the cylindrical ventilation means is arranged within the profile element on an imaginary line which is an elongation of the longitudinal extent of the ventilation slot.

It is practical if the cylindrical ventilation means is arranged axially at the outside in relation to the shoulder negative profile element.

It is advantageous if the cylindrical ventilation means is arranged axially at the outside in relation to a transverse channel, at the opening-out point thereof into the TWI region in the tire shoulder.

By way of the abovementioned arrangements of the cylindrical ventilation means, it is ensured that the ventilation function is ensured and optimized in the region that is critical with regard to the ventilation.

It is practical if the negative profile elements arranged axially at the inside in relation to the shoulder negative profile elements have exclusively ventilation slots as ventilation means. The ventilation slots replace the cylindrical ventilation ducts, whereby the maintenance costs for the vulcanization mold are reduced.

It is advantageous if the ventilation slot has a width of 25 µm to 70 µm, preferably of 30 µm to 60 µm. The width of the ventilation slot is measured perpendicular to its longitudinal extent. The abovementioned width ensures adequate ventilation, but the ingress of rubber material of the tire into the ventilation slot is prevented, such that no, or very little, flash is generated on the hot-pressed tire. Furthermore, no, or very little, fouling or blockage of the ventilation slot occurs.

It is expedient if the ventilation slot has a length of 10 mm to 40 mm, in order that the new ventilation concept can be constructed in a flexible manner. Here, the ventilation slot may exhibit different configurations.

To ensure good ventilation, it is advantageous if the ventilation slots are arranged between lamellar plates and parallel thereto, wherein a ventilation slot and a lamellar plate preferably alternate in terms of their arrangement. The ventilation slots are arranged spaced apart from the lamellar plates. The ventilation of a winter or all-season tire vulcanizing mold constitutes a challenge owing to the up to 6000 lamellar plates provided, because the discharge of the air from the intermediate spaces between the lamellar plates is difficult, because the lamellar plates impede the discharge of air. Therefore, the arrangement of the ventilation slots between the lamellar plates and parallel thereto is highly advantageous in order to ensure adequate discharging of air. It is sought to hot-press a tire which has a high-quality surface appearance. Eurovents and/or other ventilation ducts are not required in the region of the lamellar plates.

It is advantageous if the ventilation slot opens out, in a direction radially to the outside (toward the outer side of the vulcanizing mold), into a ventilation duct, the cross-sectional area of which is larger than the cross-sectional area of the ventilation slot, the diameter of which is 2 mm to 3 mm, and the cross section of which is preferably circular. In this way, during cleaning of the vulcanizing mold, the ventilation gap can be easily blown clear from the outside, wherein any rubber remnants can be driven out as rubber plugs, without leaving residues behind.

It is expedient if the ventilation slot has the same width over its longitudinal extent, preferably over its longitudinal extent and over its depth extent, in order to permit different slot arrangements on the mold surface (in order to obtain the appropriate level of ventilation) and to allow a ventilation bore to be applied from the rear side of the mold in targeted fashion.

In a particular embodiment, the two ends of a ventilation slot end within the negative profile element.

In a configuration alternative to the embodiment mentioned above, the two ends of a ventilation slot end outside the negative profile element in the negative channels that delimit the negative profile element.

It is expedient if the ventilation slot has a depth extent of 3 mm to 5 mm. It is likewise expedient if the ventilation duct has a depth extent of 10 mm to 15 mm. The ventilation concept thus complies with the average geometrical requirement of a mold segment with regard to the thickness.

The invention likewise relates to a pneumatic vehicle tire which is hot-pressed by way of a vulcanizing mold as described above.

The invention likewise relates to a method for producing a vulcanizing mold as described above, in which the mold surfaces are produced by selective laser melting. By way of the generative manufacturing method from the group of beam-type melting methods, it is normally the case that metal powder is applied in a thin layer to a base plate. The metal powder is locally fully melted by way of laser radiation, and forms a solid material layer after solidifying. It is advantageous if the ventilation means, in particular the ventilation slots and the lamellar plates, are constructed simultaneously by way of the selective laser melting process.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
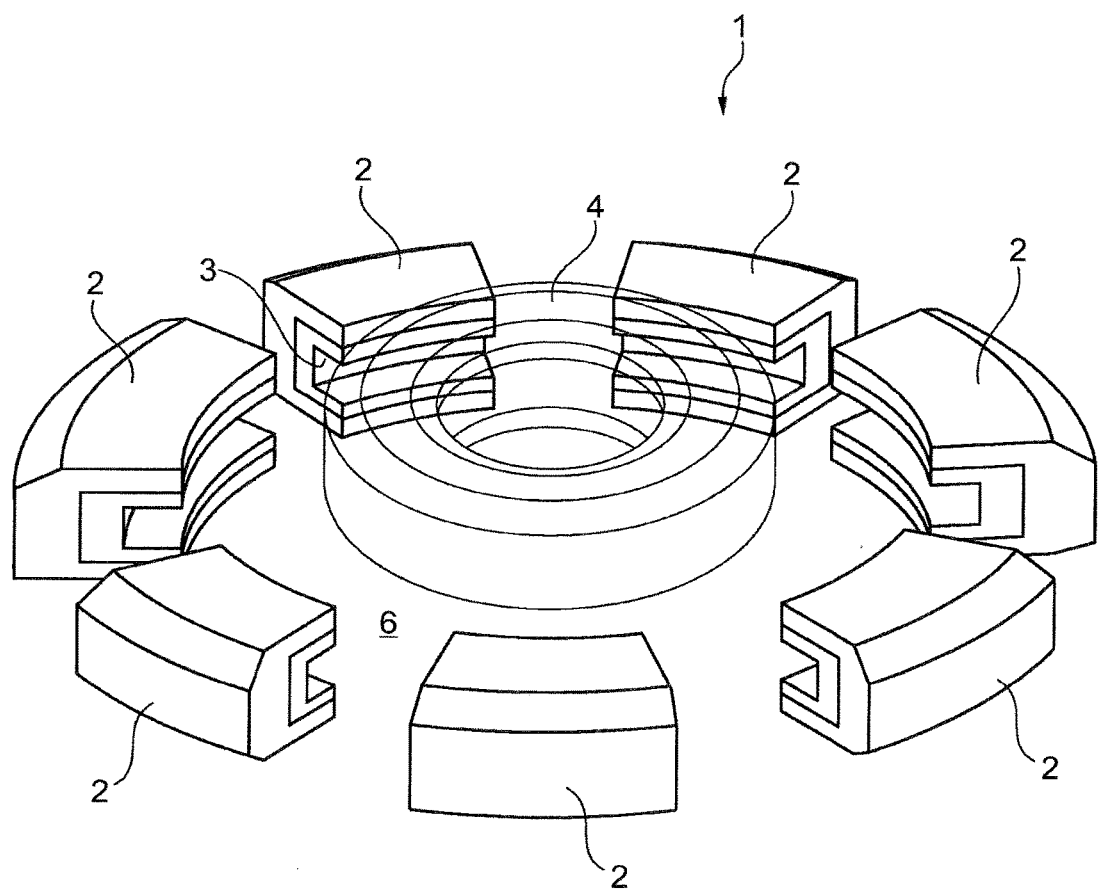
FIG. 1 shows a segmented vulcanizing mold with mold segments.

FIG. 1 is a simplified schematic illustration of a segmented vulcanizing mold 1 for vehicle tires 4, having multiple mold segments 2 that can be brought together to form a circumferentially closed mold. The mold segments 2 are radially movable and, radially at the inside, form a mold cavity 6. The mold segments 2 have mold surfaces 3 on the inside. The mold segments 2 furthermore have ventilation means (not shown in FIG. 1) which are connected to the atmosphere and through which gas from the mold cavity 6 of the vulcanizing mold 1 can be discharged through the mold segment 2 to the outside.

Figure 2:
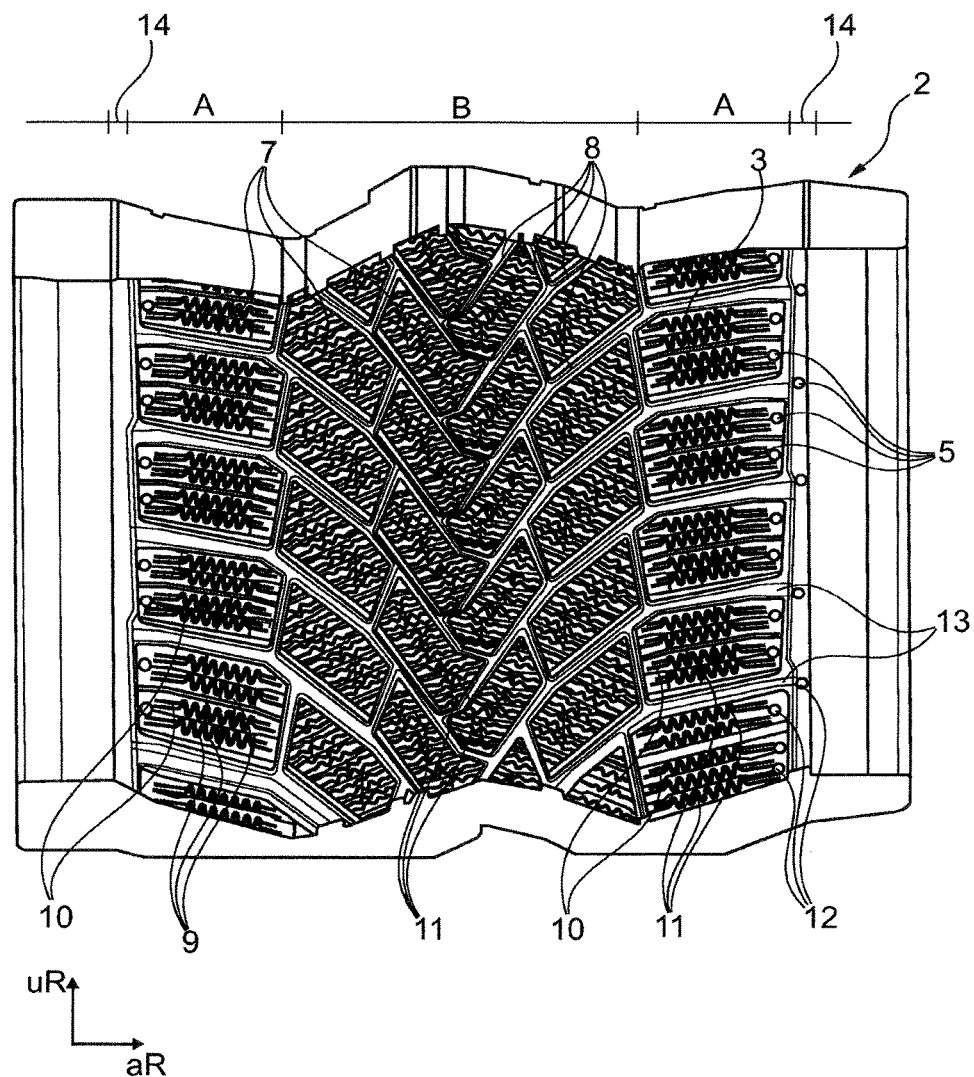
FIG. 2 shows a plan view of the mold surface of a mold segment of a vulcanizing mold according to the invention.

FIG. 2 shows a plan view of the mold surface 3 of a mold segment 2 of a vulcanizing mold according to the invention. The mold surface 3 has a negative tread profile with negative profile elements 7 for the formation of the positive tread profile having positive profile elements of the vehicle tire to be vulcanized. The negative channels 8 form webs in the mold surface 3 of the mold segment. The mold surface 3 shown here is that of a winter tire. Within the negative profile elements 7 there are arranged lamellar plates 9 which form the sipes of the tire to be hot-pressed. The lamellar plates 9 extend transversely across the negative profile element 7.

In the shoulder negative profile elements 10 there are arranged both ventilation slots 11 and, additionally, cylindrical ventilation means 12 such as for example Eurovents, which are arranged axially at the outside in relation to the ventilation slots 11 and which are partially spaced apart therefrom or immediately adjacent thereto. The shoulder negative profile elements 10 are arranged one behind the other in an encircling row, and the region of arrangement is denoted by the letter A. The cylindrical ventilation means 12 are arranged within the shoulder negative profile element 10 on an imaginary line of elongation of the longitudinal extent of the ventilation slot 11; furthermore, further cylindrical ventilation means 12 are arranged axially at the outside in relation to (to the outside of) a transverse channel 13, at the opening-out point thereof in the TWI region 14 of the tire. All of the ventilation means 5, arranged axially at the inside in relation to the shoulder negative profile elements 10, in a central tread profile region, denoted by the letter B, are exclusively ventilation slots 11 arranged in the mold surfaces 3 of the inner negative profile elements 15. At least two ventilation slots 11 are arranged in a negative profile element 7. The ventilation slots 11 run approximately transversely with respect to the circumferential direction uR and parallel to one another. The ventilation slots 11 are arranged between the lamellar plates 9 and parallel thereto. The surface area of the ventilation slots 11 of a negative profile element 7 makes up approximately 5-15% of the surface area of the negative profile element 7.

Figure 3:
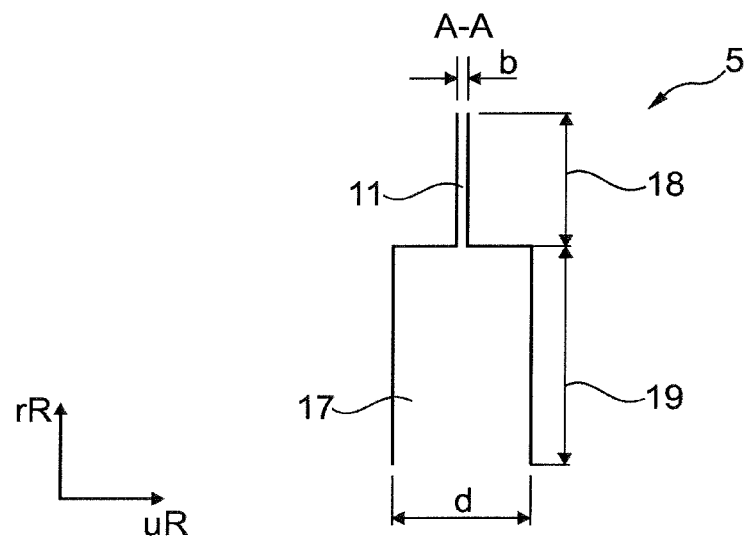
FIG. 3 shows a cross section along a ventilation slot together with the ventilation duct when viewed in section.
Figure 4:
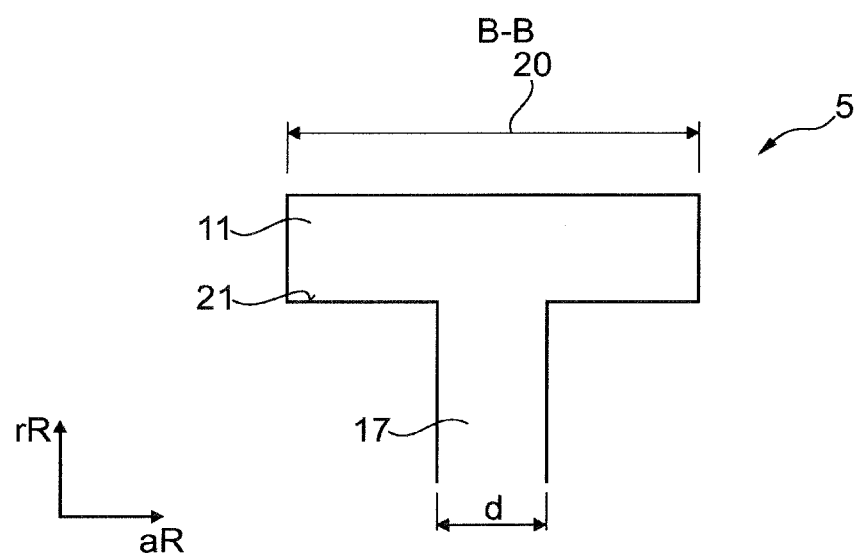
FIG. 4 shows a longitudinal section along the ventilation slot together with the ventilation duct of FIG. 3, along the section B-B of FIG. 2; and, FIG. 5 shows a longitudinal section of another ventilation slot together with the ventilation duct.

FIG. 3 shows a cross section of a ventilation slot 11 together with ventilation duct 17 along the section A-A of FIG. 2, whereas FIG. 4 shows the corresponding longitudinal section. The ventilation slot 11 has a width (b) of 25 μm to 70 μm, preferably of 30 μm to 60 μm. The ventilation slot 11 opens out into the ventilation duct 17, the cross-sectional area of which is circular and larger than the cross-sectional area of the ventilation slot 11. The diameter (d) of the ventilation duct 17 is between 2 mm and 3 mm.

The ventilation slot 11 has a radial depth extent 18 of 3 mm to 5 mm, and the ventilation duct 17 has a radial depth extent 19 of 10 mm to 15 mm. Over the longitudinal extent 20 of the ventilation slot 11 and over the depth extent 18 thereof, the width (b) remains the same. The longitudinal extent 20 is between 10 mm and 40 mm.

Figure 5:
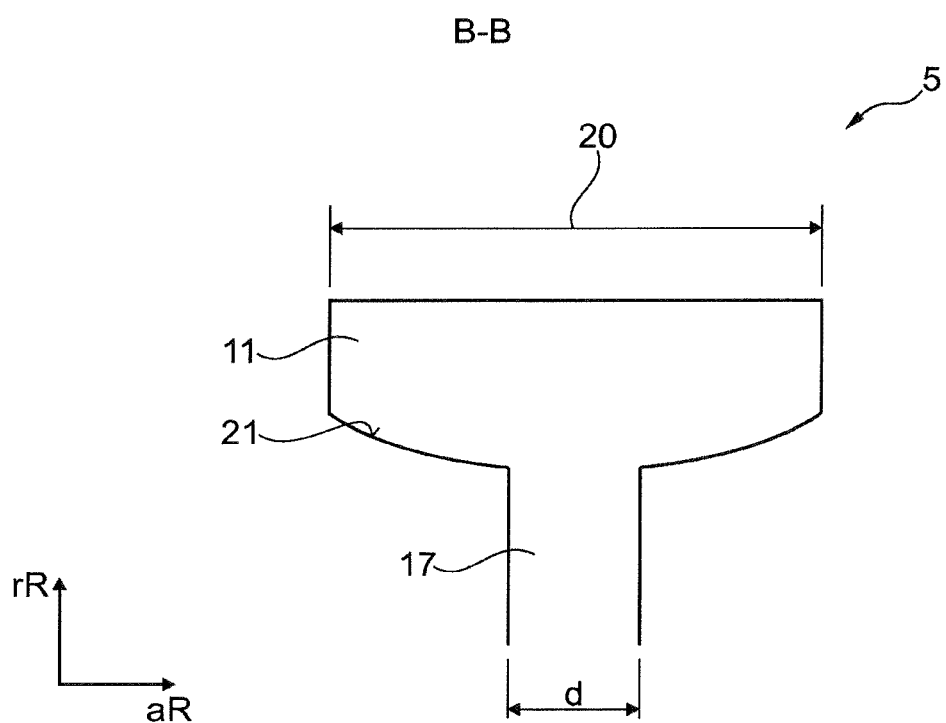

FIG. 5 shows a longitudinal section of another ventilation slot 11 together with ventilation duct 17. The longitudinal section of the ventilation means 5 differs from that of FIG. 4 in that the lower surface of the ventilation slot 21 transitions in funnel-shaped fashion into the ventilation duct 17, whereas the lower surface of the ventilation slot 21 of FIG. 4 is formed so as to run in the axial direction aR.

It is understood that the foregoing description is that of the preferred embodiments of the invention and that various changes and modifications may be made thereto without departing from the spirit and scope of the invention as defined in the appended claims.

LIST OF REFERENCE SIGNS

Part of the Description
1 Vulcanizing mold
2 Mold segment
3 Mold surface
4 Vehicle tire
5 Ventilation means
6 Mold cavity
7 Negative profile element
8 Negative channel
9 Lamellar plate
10 Shoulder negative profile element
11 Ventilation slot
12 Cylindrical ventilation means
13 Transverse channel
14 TWI region
15 Inner negative profile element
17 Ventilation duct
18 Radial depth extent of the ventilation slot
19 Radial depth extent of the ventilation duct
20 Longitudinal extent of the ventilation slot
21 Lower surface of the ventilation slot
b Width of ventilation slot
d Diameter of ventilation duct
rR Radial direction
aR Axial direction
uR Circumferential direction

What is claimed is:

1. A vulcanizing mold for winter and all-season vehicle tires, the vulcanizing mold comprising:
   a mold body;
   an inner side mold surface having a negative tread profile having negative profile elements for molding a positive tread profile having positive profile elements of the vehicle tire to be vulcanized;
   lamellar plates being arranged in said negative profile elements and configured to generate sipes in said positive profile elements;
   said negative profile elements including a shoulder negative profile element;
   at least one venting slot arranged within said shoulder negative profile element;
   said venting slot running parallel and in spaced relationship to one of said lamellar plates arranged in said shoulder negative profile element; and,
   at least one cylindrical vent arranged only axially outwards with reference to said venting slot.

2. The vulcanizing mold of claim 1, wherein said cylindrical vent is arranged within said shoulder negative profile element on an imaginary line which defines an extension of a longitudinal extent of said venting slot.

3. The vulcanizing mold of claim 1, wherein said cylindrical vent is arranged axially outwards with respect to said shoulder negative profile element.

4. The vulcanizing mold of claim 1 further comprising:
   a circumferentially extending shoulder region for accommodating said shoulder negative profile element therein and a TWI region extending directly from said shoulder region;
   a transverse channel formed in said shoulder region and opening into said TWI region; and,
   an additional cylindrical vent being arranged axially outwards with respect to said transverse channel at the opening thereof in said TWI region.

5. The vulcanizing mold of claim 1, further comprising a further negative profile element arranged axially inwardly with respect to said shoulder negative profile element; and, said further negative profile element having only venting slots.

6. The vulcanizing mold of claim 1, wherein said cylindrical vent has a valve or a minivalve closeable against the force of a spring.

7. The vulcanizing mold of claim 1, wherein said venting slot has a width (b) lying in a range of 25 µm to 70 µm.

8. The vulcanizing mold of claim 1, wherein said venting slot has a width (b) lying in a range of 30 µm to 60 µm.

9. The vulcanizing mold of claim 1, wherein said venting slot has a length lying in a range of 10 mm to 40 mm.

10. The vulcanizing mold of claim 1, wherein said venting slot is disposed between two of said lamellar plates.

11. The vulcanizing mold of claim 10, wherein said venting slot is one of a plurality of venting slots; and, said venting slots alternate with respective ones of said lamellar plates.

12. The vulcanizing mold of claim 1, further comprising a venting channel having a cross-sectional area greater than the cross-sectional area of said venting slot and having a diameter (d) lying in a range of 2 mm to 3 mm; and, said venting slot opening in a radial direction (rR) into said venting channel.

13. The vulcanizing mold of claim 1, wherein said venting slot has a constant width (b) over its length.

14. The vulcanizing mold of claim 1, wherein said venting slot has the same width (b) over its length and over its depth.

15. The vulcanizing mold of claim 1, wherein said venting slot has respective ends terminating within said shoulder negative profile element.

16. The vulcanizing mold of claim 1, further comprising negative channels delimiting said negative profile elements; and, said venting slot having respective ends terminating outside of the negative profile elements in said negative channels.

17. The vulcanizing mold of claim 1, wherein said venting slot has a depth extension lying in a range of 3 mm to 5 mm.

18. The vulcanizing mold of claim 12, wherein said venting channel has a depth extent lying in a range of 10 mm to 15 mm.

19. A method of making a vulcanizing mold which includes a vulcanizing mold for winter and all-season vehicle tires, the vulcanizing mold comprising: a mold body; an inner side mold surface having a negative tread profile having negative profile elements for molding a positive tread profile having positive profile elements of the vehicle tire to be vulcanized; lamellar plates being arranged in said negative profile elements and configured to generate sipes in said positive profile elements; said negative profile elements including a shoulder negative profile element; at least one venting slot arranged within said shoulder negative profile element; said venting slot running parallel and in spaced relationship to one of said lamellar plates arranged in said shoulder negative profile element; and, at least one cylindrical vent arranged only axially outwards with reference to said venting slot; the method comprising the step of:

selectively laser smelting said inner side mold surface into said mold body.

\* \* \* \* \*